(12) United States Patent
Kim et al.

(10) Patent No.: US 10,302,451 B1
(45) Date of Patent: May 28, 2019

(54) OPTIMIZING CLIMB PERFORMANCE DURING TAKEOFF USING VARIABLE INITIAL PITCH ANGLE TARGET

(71) Applicant: The Boeing Company, Chicago, IL (US)

(72) Inventors: Geun Il Kim, Woodinville, WA (US); Jose A. Fregnani, Sao Jose dos Campos (BR); Timothy C. Rohr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/899,435

(22) Filed: Feb. 20, 2018

(51) Int. Cl.
*G01C 23/00* (2006.01)
*G01P 13/02* (2006.01)
*B64D 43/02* (2006.01)
*G05D 1/06* (2006.01)

(52) U.S. Cl.
CPC ............ *G01C 23/005* (2013.01); *B64D 43/02* (2013.01); *G01P 13/025* (2013.01); *G05D 1/0661* (2013.01)

(58) Field of Classification Search
None
See application file for complete search history.

(56) References Cited

U.S. PATENT DOCUMENTS

| 4,247,843 A * | 1/1981 | Miller | G01C 23/005 |
| | | | 116/DIG. 43 |
| 8,665,120 B2 | 3/2014 | Thoreen | |
| 9,359,065 B2 | 6/2016 | Moser et al. | |
| 2012/0316706 A1* | 12/2012 | Guedes | G05D 1/0661 |
| | | | 701/15 |
| 2013/0090841 A1* | 4/2013 | Barraci | G08G 5/0013 |
| | | | 701/120 |

OTHER PUBLICATIONS

Wakefield et al., "Exceeding Tire Speed Rating During Takeoff", Boeing Aeromagazine, Q2 (2009).

* cited by examiner

*Primary Examiner* — John F Mortell
(74) *Attorney, Agent, or Firm* — Ostrager Chong Flaherty & Broitman P.C.

(57) ABSTRACT

Systems and methods for enhancing takeoff performance by displaying symbology representing an initial pitch angle target that optimizes the amount of payload that can be carried by an airplane. This is accomplished by determining an optimum initial pitch angle at rotation during takeoff which is associated with an optimum ratio of the takeoff safety speed to the stall speed that satisfies a specific set of climb/obstacle constraints. Targeting this optimum initial pitch angle allows the maximum takeoff gross weight that corresponds to the optimum takeoff safety speed/stall speed ratio to be selected.

13 Claims, 12 Drawing Sheets

| TAKEOFF PERFORMANCE | | TCSNF | B737-800WSFP | |
|---|---|---|---|---|
| AIRPORT DTM-EDLW | | AIRCONDITIONING AUTO | | |
| RUNWAY 06 | | ANTI-ICING OFF | | |
| LINEUP ALL | | TAKEOFF FLAGS OPTIMUM | | |
| REUNWAY CONDITION WET | | ENGINE DERATE AUTO DERATE | | |
| WIND DIR. & SPD 90° 7 Kt HEAD: 6 CROSS: 3 | | IMPROVED CLIMB OPTIMUM | | |
| OAT 13°C | | ASSUMED SELECTION OPTIMUM | | |
| QHN 1015 hPa | | TOW 65300 Kg | MAC % 23.8 | |
| TOW: | 65300 Kg OBSTACLE | ASMD: +32.2°C | RED%N1: | 90,61 |
| THRUST: | 22K | V1: 128 Kt | STAB TRIM: | 4,67 |
| FLAPS: | 15 | VR: 133 Kt | MIN CLEAN: | 209 Kt |
| MFRA: | 2000 Ft | IPT 12.6 | STOP MARGIN: | 107 m |
| CLIMB TO MSA ON RUNWAY HEADING AND CONTACT WITH ATC | | | | |

FIG. 16

OPTIMIZING CLIMB PERFORMANCE DURING TAKEOFF USING VARIABLE INITIAL PITCH ANGLE TARGET

BACKGROUND

The technology disclosed herein generally relates to systems and methods for controlling an airplane to achieve desired performance and, more particularly, relates to systems and methods for enhancing the performance of an airplane during takeoff.

Takeoff is a phase of flight when an airplane transitions from moving along the ground to flying in the air. An airplane may make this transition when a takeoff speed is reached. The takeoff speed for an airplane may vary based on a number of factors. These factors include, for example, air density, airplane gross weight, airplane configuration, runway conditions and other suitable factors. A typical takeoff distance (referred to by a pilot) may be based on the assumption that all runway surfaces are paved, level, smooth and dry. However, in reality runway surfaces differ as does the runway gradient or slope (i.e., the change in runway height over a length of runway, expressed as a percentage). In addition, the pilot should consider the gross weight of the airplane when predicting takeoff distance (a.k.a. takeoff roll). An increase in gross weight may have the following effects on takeoff performance: (1) higher lift-off speed; (2) greater mass to accelerate; and (3) increased drag and ground friction. Furthermore, the speed needed for a takeoff is relative to the motion of the air. For example, a headwind reduces and a tailwind increases the groundspeed at the point of takeoff. Accordingly, the effect of wind must also be considered when predicting takeoff distance. The density altitude also affects takeoff performance. Density altitude is determined by first finding the pressure altitude and then correcting this altitude for nonstandard temperature variations. Using a flight computer, density altitude can be computed by inputting the pressure altitude and outside air temperature. As the density of the air increases (lower density altitude), airplane performance increases.

Information regarding the factors affecting takeoff performance may be incorporated in charts to which a pilot can refer. Takeoff distance charts are typically provided in several forms and allow a pilot to compute the takeoff distance of the airplane with no flaps or with a specific flap configuration. The typical takeoff distance chart provides for various airplane weights, altitudes, temperatures, winds, and obstacle heights.

Various segments of the takeoff flight path are specified in Part 25 of the Federal Aviation Regulations. In accordance with those specifications, during the first segment of the takeoff flight path, the airplane steadily increases its speed from zero to the minimum takeoff safety speed $V_2$. During that first segment, the airplane first reaches the takeoff decision speed $V_1$ and then reaches the rotation speed $V_R$, before reaching the minimum takeoff safety speed $V_2$.

A known operations technique for improving climb takeoff uses excess field length to increase the climb energy and, as consequence, increase the gross gradients for the various takeoff segments. In accordance with this procedure, this is achieved by increasing the rotation speed $V_R$ and the takeoff safety speed $V_2$ by a certain amount, which corresponds to increasing the takeoff distance, or whenever $V_R$ reaches the tire speed rating. Although the rotation speed $V_R$ and takeoff safety speed $V_2$ are modified, the initial pitch angle target is fixed and the same as the one used in the regular takeoff technique.

SUMMARY

The subject matter disclosed in detail below is directed to systems and methods for enhancing takeoff performance by displaying symbology representing an initial pitch angle target (hereinafter "initial pitch target" (IPT)) that optimizes the amount of payload that can be carried by an airplane. This is accomplished by determining an optimum initial pitch angle at rotation during takeoff which is associated with an optimum ratio of the takeoff safety speed $V_2$ to the stall speed $V_s$ (hereinafter "optimum $V_2/V_s$ ratio") that satisfies a specific set of climb/obstacle constraints. Targeting this optimum initial pitch angle allows the maximum takeoff gross weight that corresponds to the optimum $V_2/V_s$ ratio to be selected.

This disclosure proposes an implementation in avionics that can be used to improve takeoff performance in a manner that will result in an increase the amount of payload that an airplane can carry. In accordance with the methodology proposed herein, an optimum initial pitch angle is calculated based in part on the optimum $V_2/V_s$ ratio and then symbology representing the initial pitch target to be achieved by the pilot during takeoff is displayed in a cockpit or on a flight deck. The ability to select an optimum value from a multiplicity of variable initial takeoff pitch angles could potentially enhance the takeoff performance of the airplane by maximizing the airplane's payload while operating in accordance with climb/obstacle constraints.

Although various embodiments of systems and methods for enhancing takeoff performance by determining an optimum initial pitch angle and then displaying symbology representing an initial pitch target are disclosed in some detail below, one or more of those embodiments may be characterized by one or more of the following aspects.

One aspect of the subject matter disclosed in detail below is a method for displaying information to a pilot in a cockpit or on a flight deck, comprising: calculating an optimum initial pitch angle of an airplane on a runway; and displaying symbology representing an initial pitch target corresponding to the optimum initial pitch angle on a display screen during takeoff. This method may further comprise retrieving an optimum ratio of takeoff safety speed to stall speed from a lookup table, wherein the optimum initial pitch angle is calculated is based in part on the optimum ratio of takeoff safety speed to stall speed. The plurality of input parameter values comprise a takeoff weight of the airplane, a field elevation of the runway, an outside air temperature, a flap setting and a bleed and engine anti-ice status.

Another aspect of the subject matter disclosed in detail below is an avionics system comprising a display screen and a computer system configured to calculate an optimum initial pitch angle of an airplane on a runway and then control the display screen to display symbology representing an initial pitch target corresponding to the optimum initial pitch angle. The computer system is further configured to retrieve an optimum ratio of takeoff safety speed to stall speed from a non-transitory tangible computer-readable storage medium, wherein the optimum initial pitch angle is calculated is based in part on the optimum ratio of takeoff safety speed to stall speed.

A further aspect of the subject matter disclosed in detail below is a flight management system comprising a flight management computer and a control display unit communicatively coupled to the flight management computer, wherein the control display unit comprises a display screen, and the flight management computer is configured to execute an initial pitch target function in which an optimum initial pitch angle of an airplane on a runway is calculated and then a command is sent to the control display unit instructing the control display unit to display symbology representing an initial pitch target corresponding to the optimum initial pitch angle on the display screen. The flight management computer is further configured to retrieve an optimum ratio of takeoff safety speed to stall speed from a lookup table and calculate the optimum initial pitch angle based in part on the optimum ratio of takeoff safety speed to stall speed. The control display unit is configured to receive an input from a pilot that enables the initial pitch target function and then control the display screen to display symbology representing whether the initial pitch target function has been enabled or not.

Other aspects of systems and methods for enhancing takeoff performance by determining an optimum initial pitch angle and displaying symbology representing an initial pitch target that optimizes the amount of payload that can be carried by an airplane are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. The drawings are not drawn to scale.

FIG. 16 is a diagram representing a front view of a display screen incorporated in an electronic flight bag configured with takeoff performance software. In this example, alphanumeric symbols are displayed which indicate the value of the initial pitch target.

Reference will hereinafter be made to the drawings in which similar elements in different drawings bear the same reference numerals.

DETAILED DESCRIPTION

Illustrative embodiments of systems and methods for enhancing takeoff performance by determining an optimum initial pitch angle and displaying symbology representing an initial pitch target that optimizes the amount of payload that an airplane can carry are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In aviation, V-speeds are standard terms used to define airspeeds important or useful to the operation of airplanes. These speeds are derived from data obtained by airplane designers and manufacturers during flight testing and verified in most countries by government flight inspectors during airplane certification testing. The actual speeds represented by these designators are specific to a particular model of airplane. They are expressed by the airplane's indicated airspeed (and not by, for example, the ground speed), so that pilots may use them directly, without applying correction factors, since the instruments onboard a typical commercial airplane also show indicated airspeed.

Figure 1:
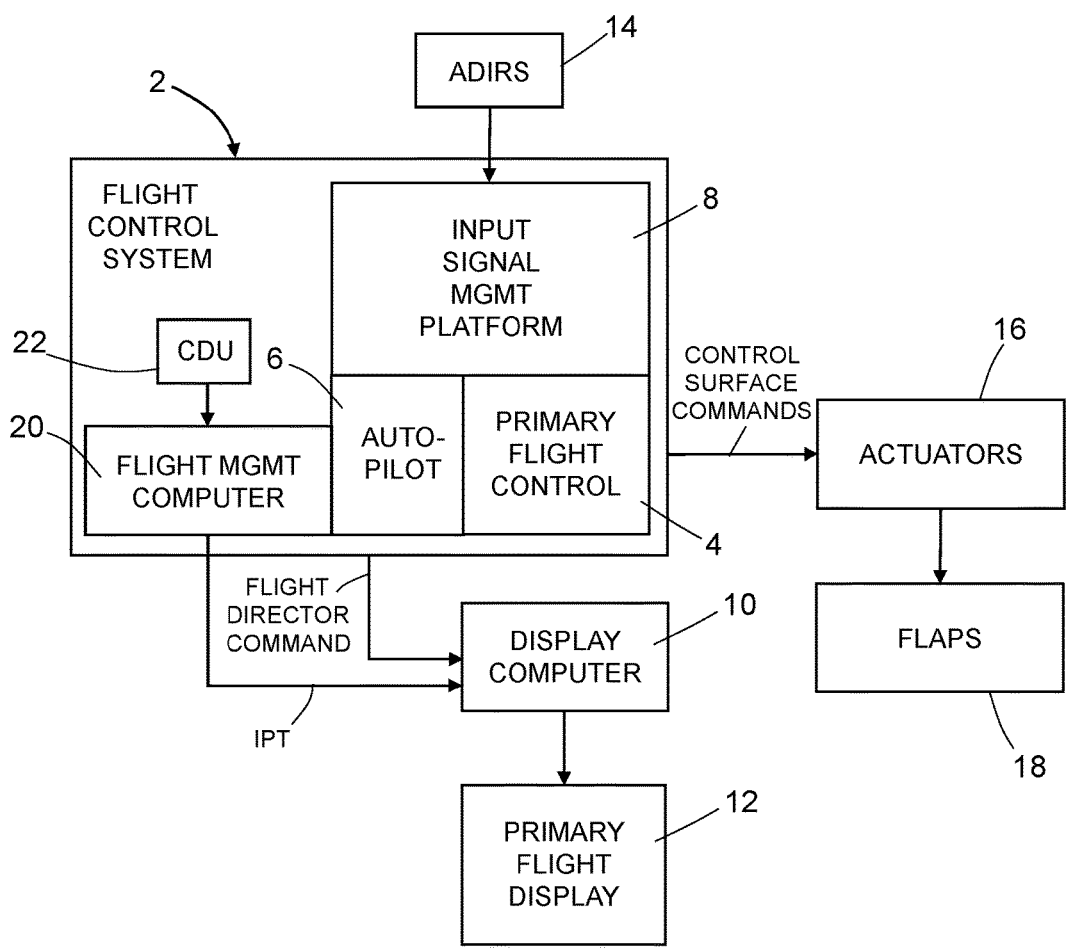
FIG. 1 is a high-level block diagram showing components of an airplane control system that can be programmed to provide the functionality disclosed herein.

FIG. 1 is a block diagram showing hardware components of a flight control system of a type which already exists on modern airplanes. The air-data system and inertial reference system (ADIRS) 14 comprises an air data part that provides airspeed, angle of attack, temperature and barometric altitude data, while the inertial reference part gives attitude, flight path vector, ground speed and positional data to an input signal management platform 8 of a flight control system 2. The flight control system 2 comprises a primary flight control computer/function 4 and an auto-pilot computer/function 6. The primary flight control computer 4 and auto-pilot computer 6 could have independent input signal management platforms.

The flight control system 2 further comprises a flight management computer 20 and a control display unit 22 (hereinafter "CDU 22"). The CDU 22 is the primary interface between the flight management computer 20 and the pilot. The flight management computer 20 calculates an initial pitch target that will optimize the amount of payload that can be carried by the airplane, based on information acquired by the ADIRS 14 and other information that will be described in detail later herein. The flight management computer 20 sends the calculation result to a display computer 10 that controls a primary flight display 12.

During takeoff, the primary flight control computer 4 outputs a flap command to the flap actuators 16 based on commands input by the flight crew. The flap command is determined based on the angular setting of the flaps 18 which will achieve the initial pitch target. The flaps 18 are used to aid in the performance of the takeoff rotation that achieves the initial pitch target.

In accordance with one embodiment, the primary flight display 12 includes a visual indication of the calculated initial pitch target sent by the IPT computer 20 to the display computer 10. Symbology representing the initial pitch target is displayed on the attitude indicator of the primary flight display 12 in a manner that provides a clear, unambiguous indication of the initial pitch target that is clearly distinguishable from other symbols displayed on modern cockpit displays. See, for example, IPT indicator 11 shown in FIG. 13 (discussed in detail below).

Figure 2:
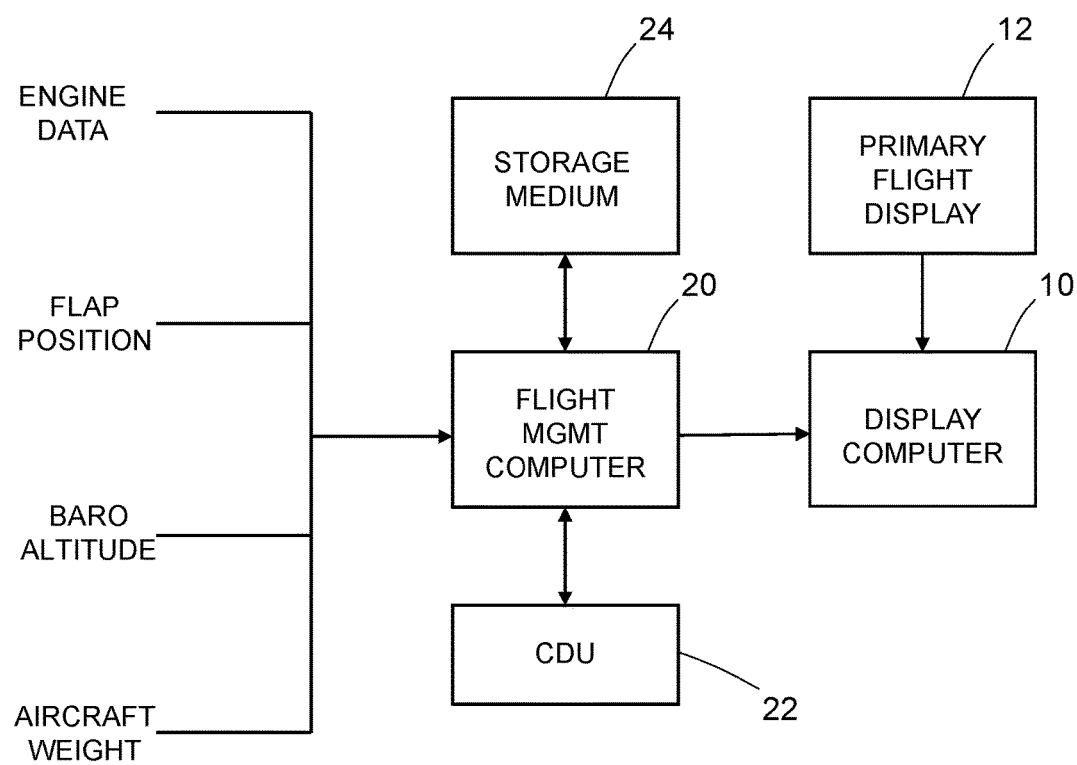
FIG. 2 is a block diagram showing some components of a system for displaying pitch-based guidance commands during takeoff.

FIG. 2 is a block diagram showing some components of a system for displaying pitch-based guidance commands during takeoff. The system can be manually activated by the pilot or can be automatically activated by a monitoring function executed by a computer.

The system shown in FIG. 2 comprises a flight management computer 20, a display computer 10 communicatively coupled to the flight management computer 20, a primary flight display 12 communicatively coupled to the display computer, a CDU 22 communicatively coupled to the flight management computer 20, and non-transitory tangible computer-readable storage medium 24 communicatively coupled to the flight management computer 20.

The flight management computer 20 receives engine data as well as data representing flap position, barometric altitude and airplane weight. The onboard subsystems for providing such data to a computer are well known to persons skilled in the art. The engine data may comprise the throttle lever angle, turbofan power ratio (TPR) or fan speed (N1); the flap position may be the actual or a selected flap position; the altitude may comprise GPS altitude, radio altitude, pressure altitude or voted static pressure state; and the airplane weight (which was previously calculated by the flight management computer 20) is retrieved from internal memory of the flight management computer 20.

The non-transitory tangible computer-readable storage medium 24 stores airplane performance data tables (e.g., lookup tables) corresponding to known airplane states for a variety of flight conditions. Such charts include desired pitch attitude and power setting for various flight phases, including climb, cruise, descent and final approach. The storage medium 22 may store data tables as well as digital data representing curves of one parameter as a function of another parameter.

To facilitate the display of the IPT indicator 11 (see FIG. 13), the flight management computer 20 retrieves pitch-based guidance command data from the non-transitory tangible computer-readable storage medium 22 in the form of a lookup table that can be temporarily stored in internal memory of flight management computer 20. The flight management computer 20 then retrieves data from that lookup table by inputting a data string representing a plurality of input parameter values, including takeoff weight of the aircraft, altitude of the runway (hereinafter "field elevation"), outside air temperature near the airplane, flap setting, and bleed and anti-ice status. The lookup table returns data representing the optimum $V_2/V_s$ ratio for takeoff of the airplane, which is used in the calculation of the optimum initial pitch angle.

Based on the information read from storage medium 22, flight management computer 20 sends data representing pitch-based guidance commands to the display computer 10, instructing the display computer 10 to cause the display of symbology representing the initial pitch target. Display computers are well-known in the art and the basic operation of display computer 10 will not be described in detail herein. In the embodiment depicted in FIG. 2, the display computer 10 is programmed to cause special symbology to be displayed on the primary flight display 12. The pilot is able to obtain takeoff guidance by glancing at the IPT symbology during the takeoff procedure.

Figure 3:
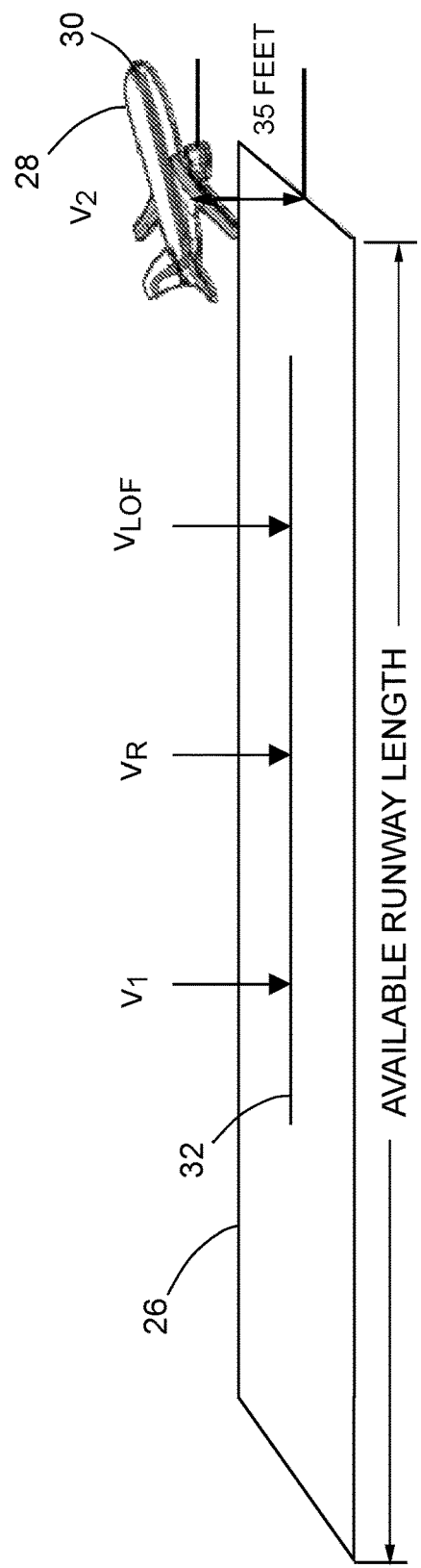
FIG. 3 is a diagram showing a scenario in which a commercial airplane is located at the end of a runway at an elevation of 35 feet following completion of the first segment of a takeoff flight path. A sequence of common takeoff V-speeds are indicated by arrows pointing at various positions along the runway, accompanied by V-speed designators arranged in the increasing order in which those speeds are achieved.

FIG. 3 is a diagram showing a scenario in which a commercial airplane 28 is located at the end of a runway 26 at an elevation of 35 feet following completion of the first segment of a takeoff flight path 32. A sequence of common takeoff V-speeds (defined by Federal Aviation Regulations) are indicated by arrows pointing at various positions along the takeoff flight path 32, accompanied by V-speed designators arranged in the increasing order in which those speeds are achieved.

The designator $V_1$ corresponds to the takeoff decision speed above which the takeoff should not be aborted. The designator $V_R$ corresponds to the rotation speed, which is the speed at which the pilot begins to apply control inputs to cause the airplane nose 30 to pitch up, after which the airplane nose 30 will leave the ground. The designator $V_{LOF}$ corresponds to the liftoff speed at which the main landing gear (not visible in FIG. 3) leaves the ground. The designator $V_2$ corresponds to the takeoff safety speed, which is the speed at which the airplane 28 may safely climb with one engine inoperative.

Typically gross weight and flap setting are the variables used to determine the rotation speed $V_R$ for a particular model of airplane under a particular set of takeoff conditions. Some airplane charts (stored in storage medium 22 seen in FIG. 2) also consider altitude. The takeoff safety speed $V_2$ is reached by 35 feet above ground level and is never less than 1.2 times the stall speed $V_s$ in the configuration used for takeoff. The takeoff safety speed $V_2$ also varies with gross weight and flap setting.

As used herein, the term "flap" means a high-lift device fitted to a wing of an airplane, which when deployed increases the camber and often the area of the wing, making it more effective at low speed, thus creating more lift. Flaps are deployed before takeoff and retracted during the climb.

The takeoff performance of a commercial airplane can be assessed by determining its maximum gross weight at takeoff. This weight may be limited by any one of several constraints. The applicable constraints include structural limitations (e.g., the maximum certificated takeoff weight) and climb and field length limits. Depending on the particular airplane model, the takeoff may also be constrained by brake energy and tire speed rating, which affect the field length limit. Runway conditions should also be taken into consideration. Tabulated data furnished by the manufacturer in the form of charts (stored in storage medium 22) to be referenced by the pilot take into account a limited number of factors.

As used herein, the term "climb limit weight" means the maximum takeoff gross weight limited by climb capability. This limit is the ability of the airplane to climb from liftoff to 1500 feet above the airport elevation and to meet takeoff flight path-limiting climb gradients under existing conditions of temperature and pressure altitude, which are used to determine density altitude. The density altitude affects the ability of the engine to produce thrust and of the wing to produce lift.

The takeoff flight path is a product of the certification process contained in Part 25 of the Federal Aviation Regulations. The takeoff flight path usually has four segments and is based on one-engine-inoperative performance. All gradients in the takeoff flight path are gross gradients. The first segment (shown in FIG. 3) begins at liftoff and ends when the landing gear is fully retracted. The rotation speed $V_R$ is selected by the manufacturer so that the takeoff safety speed $V_2$ is achieved by the time the airplane reaches 35 feet above ground level. During rotation, the nose 30 is raised to a nominal 5° to 15° (this number is variable and a function of airplane model) nose-up pitch attitude (hereinafter "initial pitch target") to increase lift from the wings and effect liftoff.

As used herein, the term "field limit weight" means the maximum takeoff gross weight for the length of runway available. As in the case of the climb limit weight, ambient conditions must be taken into account. In addition to temperature and pressure altitude, wind and runway slope are also considered.

As used herein, the term "takeoff distance" is the distance required to accelerate on all engines until the takeoff decision speed $V_1$ is reached, lose one engine, continue to accelerate to the rotation speed $V_R$, rotate and reach 35 feet above ground level.

As used herein, the term "gross gradient" means the change in height divided by the change in horizontal distance traveled by the airplane 28 (multiplied by 100), which height and distance data is acquired during flight testing conducted by the manufacturer during certification. For example, a 2% gross gradient means that the airplane 28 will climb 2 feet for every 100 feet of horizontal distance that the airplane 28 flies.

When the airplane 28 is cleared for takeoff, the pilot releases the brakes and controls the engines to increase thrust. The airplane 28 accelerates down the runway 26 until the amount of lift generated by the wings permits safe takeoff, at which time the pilot actuates the flaps to cause the nose 30 of the airplane 28 to rotate upward. The airplane 28 leaves the ground with its nose 30 pitched upwards and then continues to accelerate to the liftoff speed $V_{LOF}$. The first segment ends when gear retraction is complete and the airplane is at least 35 feet above ground level and has reached the takeoff safety speed $V_2$. The second segment begins at the end of the first segment. During the second segment, the airplane climbs to a minimum height of 400 feet above ground level.

Figure 4:
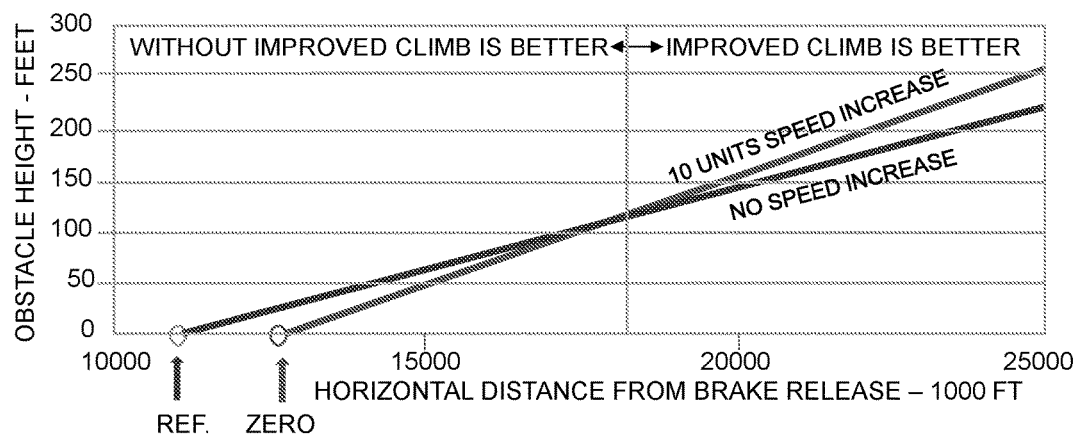
FIG. 4 is a graph of altitude (in feet) versus horizontal distance from brake release (in feet) showing takeoff performance with improved climb when the speed is increased by 10 units (the line starting at the "zero" point) and without improved climb with no speed increase (the line starting at the "reference" point).

As previously mentioned, an improved operations technique has been used to increase the climb limit weight using the excess field length to increase the climb energy and, as a consequence, increase the gross gradient for at least the first segment of the takeoff flight path 28. This can be accomplished by increasing the rotation speed $V_R$ and the takeoff safety speed $V_2$ by a certain amount, which corresponds to increasing the takeoff distance, or whenever $V_R$ reaches the tire speed rating. Although the rotation speed $V_R$ and takeoff safety speed $V_2$ are modified, the initial pitch target is fixed and the same as the one used in the regular takeoff technique. FIG. 4 is a graph of height above ground level (in feet) versus horizontal distance from brake release (in feet) showing takeoff performance with improved climb when the speed is increased by 10 units (the line starting at the "zero" point) and without improved climb with no speed increase (the line starting at the "reference" point).

Figure 5:
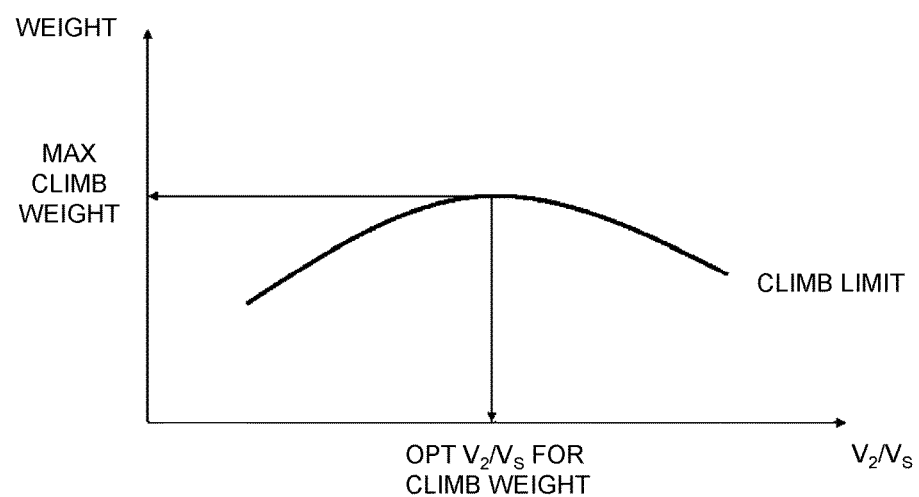
FIG. 5 is a graph of climb limit weight as a function of $V_2/V_s$ ratio for an exemplary commercial airplane.

The technique of using the excess field length to improve climb energy (illustrated in FIG. 4) may be explained examining the known equations of motion during the initial climb out (assuming $V=V_2$). It can be shown that there is always a value of the ratio of takeoff safety speed $V_2$ to stall speed $V_s$ (hereinafter "$V_2/V_s$ ratio") where a maximum climb limit weight is reached. FIG. 5 is a graph of climb limit weight as a function of $V_2/V_s$ ratio for an exemplary commercial airplane. The downward-pointing arrow indicates an optimum $V_2/V_s$ ratio corresponding to the maximum climb limit weight.

Figure 6:
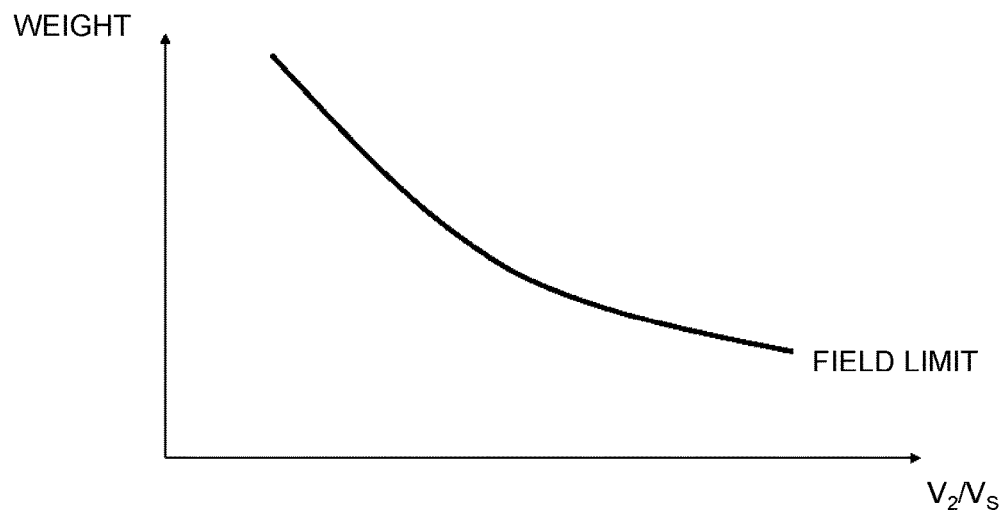
FIG. 6 is a graph of field limit weight as a function of $V_2/V_s$ ratio for an exemplary commercial airplane.

However, the increase in the takeoff safety speed $V_2$ depicted in FIG. 4 is accompanied by an increase in the accelerate stop distance available (once $V_R$ is also increased). (As used herein, the term "accelerate stop distance available" is the length of the takeoff run plus the length of the stopway, where provided.) Thus it may be expected that these increases would have a negative impact on the field limit weight when the accelerate stop distance available is fixed. FIG. 6 is a graph of field limit weight as a function of $V_2/V_s$ ratio for an exemplary commercial airplane.

Figure 7:
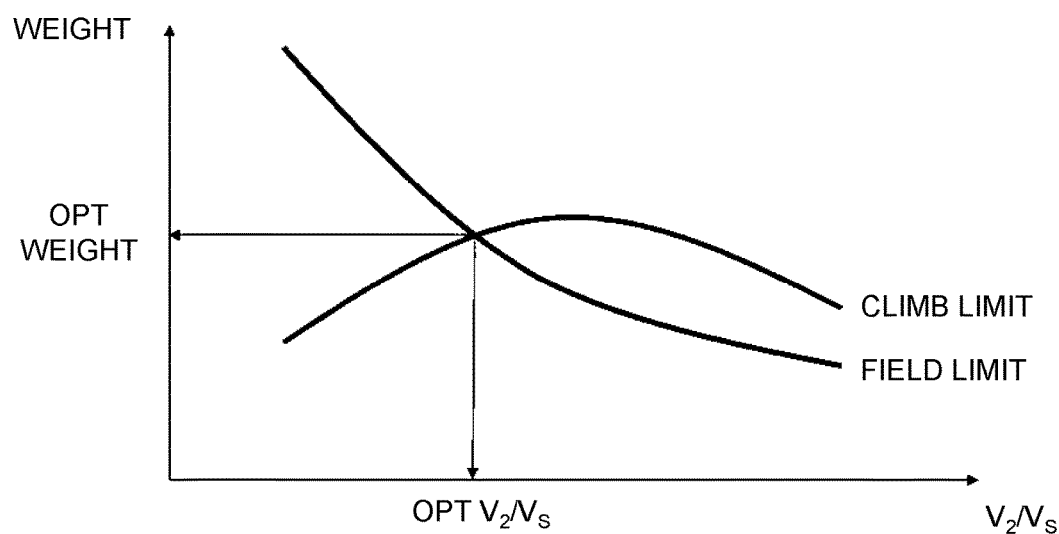
FIG. 7 is a graph combining the curves seen in FIGS. 5 and 6.

Combining both effects, it is possible to determine the optimum $V_2/V_s$ ratio for any takeoff considering climb and field limitations. FIG. 7 is a graph combining the curves seen in FIGS. 5 and 6. The point where the two curves intersect corresponds to an optimum $V_2/V_s$ ratio. That optimum $V_2/V_s$ ratio in turn corresponds to an optimum takeoff gross weight (hereinafter "takeoff weight") of the airplane.

In accordance with the foregoing concept, it is possible to determine the optimum pitch angle θ associated with the optimum $V_2/V_s$ ratio. Targeting this optimum pitch angle maximizes the climb limit weight, once the optimum pitch angle corresponds exactly to the optimum $V_2/V_s$ ratio. On the one hand, if the pitch angle is too low, the takeoff distance may increase to a point that the airplane must travel too long a distance before reaching a height 35 feet above ground level, thereby resulting in a lower allowable takeoff gross weight. On the other hand, if the pitch angle is too high, then the drag may increase so much the airplane will be unable to reach the required takeoff safety speed $V_2$ unless the takeoff gross weight is reduced.

Figure 8:
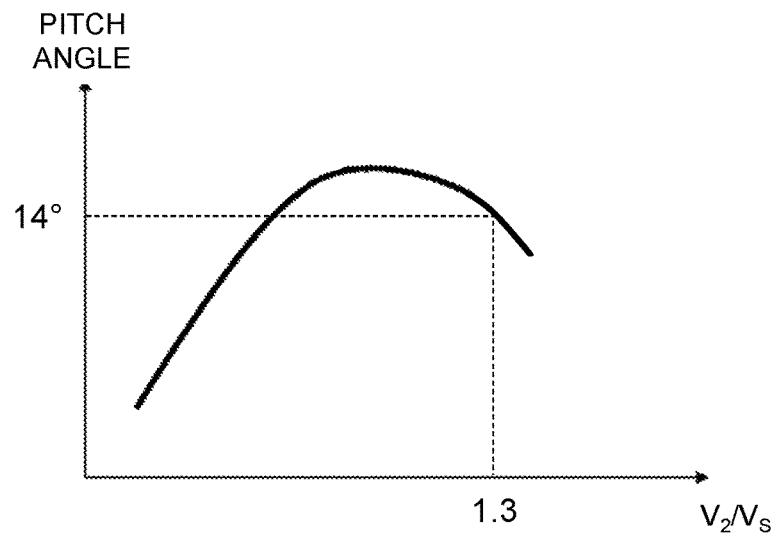
FIG. 8 is a graph of pitch angle $\theta$ versus $V_2/V_s$ ratio for an exemplary commercial airplane.
Figure 9:
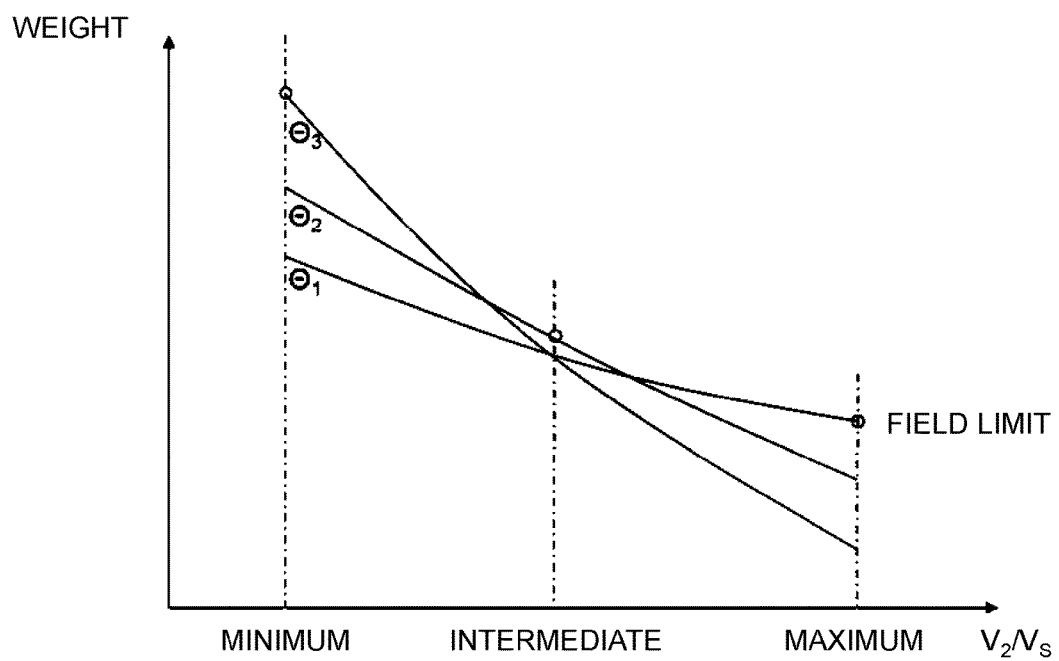
FIG. 9 is a graph of the field limit weight as a function of the $V_2/V_s$ ratio for an exemplary commercial airplane for three different pitch angles $\theta_1$, $\theta_2$ and $\theta_3$.
Figure 10:
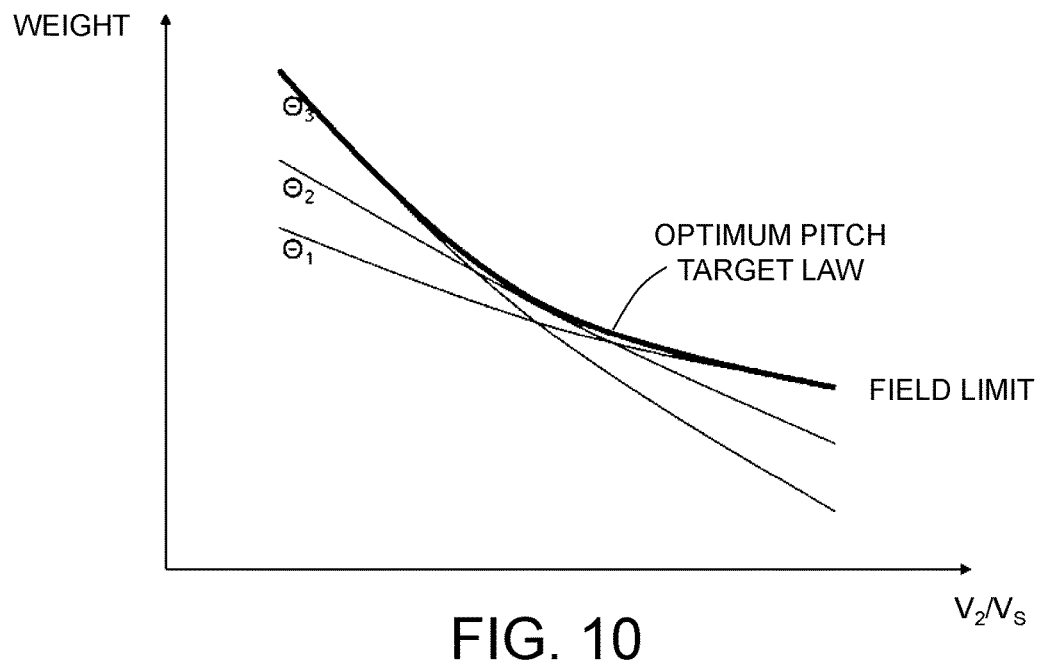
FIG. 10 is a graph of the field limit weight as a function of the $V_2/V_s$ ratio which is the same as the graph seen in FIG. 9 except for the addition of a bold curved line which represents the optimum pitch target law.
Figure 11:
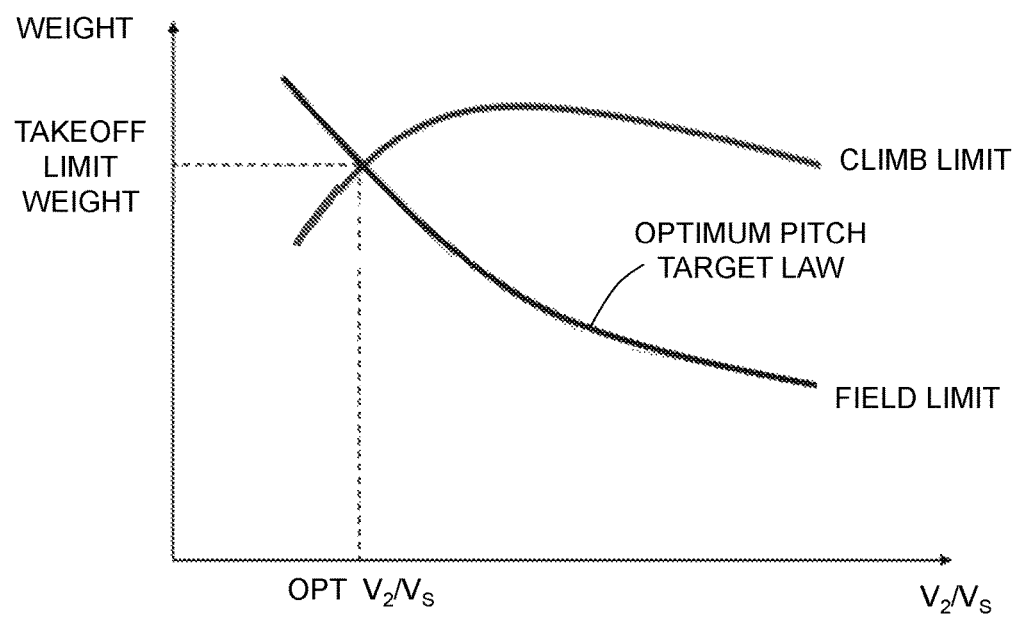
FIG. 11 is a graph showing the climb limit weight and optimum pitch target law as a function of the $V_2/V_s$ ratio for an exemplary commercial airplane.

FIG. 8 is a graph of pitch angle θ versus $V_2/V_s$ ratio for an exemplary commercial airplane. A typical range of $V_2/V_s$ is 1.2 to 1.5 in short-mid haul narrow body jets (such as the Boeing 737 family). For the purpose of illustration, an exemplary aircraft at maximum takeoff weight might have an initial pitch angle of about 17 degrees when $V_2/V_s=1.25$. For a maximum $V_2/V_s=1.5$, the initial pitch angle may change to around 12 degrees. Thus the sensitivity would be about −5 degrees for every 0.3 increase in the $V_2/V_s$ ratio. FIG. 8 depicts an example wherein the optimum $V_2/V_s$ ratio was equal to 1.3 (indicated by the dashed vertical line in FIG. 8). Based on calculations of the type disclosed in detail below, the resulting optimum initial pitch angle might be 14 degrees (indicated by the dashed horizontal line in FIG. 8). FIG. 9 is a diagram representing a graph of the field limit weight as a function of the $V_2/V_s$ ratio for an exemplary commercial airplane for three different pitch angles $\theta_1$, $\theta_2$ and $\theta_3$. It is noticeable in FIG. 9 that the selection of different pitch angles impacts the field limit weight. Note that there is always an optimum pitch target law that complies on field limits and respective maximum and minimum $V_2/V_s$ ratios (set by certification requirements), as indicated by the bold curve labeled "Field Limit" which appears in FIG. 10. Therefore, by combining both climb and field weight limitations as shown in FIG. 11, it is possible to select an optimum initial takeoff pitch angle which is associated with the takeoff limit weight (hereinafter "maximum takeoff weight").

Considering the concepts explained with reference to FIGS. 5-11, this disclosure proposes to implement a variable takeoff pitch target concept in an avionics system for a commercial airplane. This technique has potential to enhance the current improved climb technique (using fixed initial climb-out pitch target), taking advantage of full Climb/Obstacle/Field performance trade-offs on optimum $V_2/V_s$ ratio computations. The following operational concepts are to be embedded in the proposed avionics implementation.

First, the initial pitch target (IPT), corresponding to the optimum value of the pitch angle, is calculated by the flight management computer 20 as a function of takeoff weight, environmental conditions (outside air temperature (OAT) and Q code indicating atmospheric pressure (QNH)) and configuration (flap setting, bleed and engine anti-ice status) in both airport of entry (AOE) and one engine inoperative (OEI) scenarios.

The IPT would also be limited by the geometry of the airplane (i.e., velocity minimum unstick (VMU), which is the lowest speed needed for takeoff), tire speed rating, brake energy limit and certification boundaries for $V_2/V_s$ (minimum and maximum).

In accordance with one embodiment, at every refresh cycle of the flight management computer 20 (see FIG. 1), the optimum pitch angle $\theta$, associated to the optimum $V_2/V_s$ ratio, is calculated (and updated) from liftoff up to a certain final altitude (defined by the pilot) via the following formulas:

$$\theta = \left(\alpha_0 + \frac{F_0(\rho/1.225)^{0.5}}{GW} + C_1\left(\frac{V_{2opt}^2}{GW}\right) + C_2\left(\frac{GW}{V_{2opt}^2}\right)\right)\cdot\left(\frac{180}{\pi}\right)$$

$$C_1 = -C_{D0}\cdot\left(\frac{1}{2}\right)\cdot\rho\cdot S$$

$$C_2 = 2\left(\frac{1}{(e\cdot AR\cdot\pi)} + 1/a\right)\cdot(\rho\cdot S)$$

$$V_{2opt} = \left(\frac{V_2}{V_s}\right)_{opt}\cdot\sqrt{\frac{2\cdot GW}{\rho\cdot S\cdot C_{Lmax}}}$$

$$\rho = \left(\frac{SAT + 273.15}{273.15}\right)^{4.25588}$$

where $\alpha_0$ is the angle of attack for zero lift (in radians) (an airplane aerodynamic parameter); $F_0$ is the net takeoff thrust at reference altitude (in Newtons), calculated by the flight management computer 20 (or engine control computers) as a function of altitude, OAT and bleed and anti-ice status; $C_{D0}$ is the drag coefficient when lift is zero (an airplane aerodynamic parameter); S is the airplane wing reference area (in square meters); $C_{Lmax}$ is the maximum lift coefficient for a given flap setting (an airplane aerodynamic parameter); e is the span efficiency factor (a.k.a. Oswald factor) (an airplane aerodynamic parameter); AR is the wing aspect ratio; a is the slope of the low-speed lift coefficient curve (1/rad) (an airplane aerodynamic parameter); SAT is the static air temperature (degrees Celsius), taken from the air data inertial reference unit (ADIRU), which is a key component of the ADIRS 14 (see FIG. 1); GW is the actual gross weight; and $(V_2/V_s)_{opt}$ is the optimum $V_2/V_s$ ratio determined by the flight management computer 20 via table interpolation (see Climb and Field Limits in FIG. 7), as function of gross weight, altitude, temperature and configuration (i.e., flap setting and bleed and anti-ice system status). Thus the optimum pitch angle $\theta$ is derived from this interpolation. The optimum pitch angle $\theta$ is then set equal to the initial pitch target to be displayed to the pilot.

Figure 12:
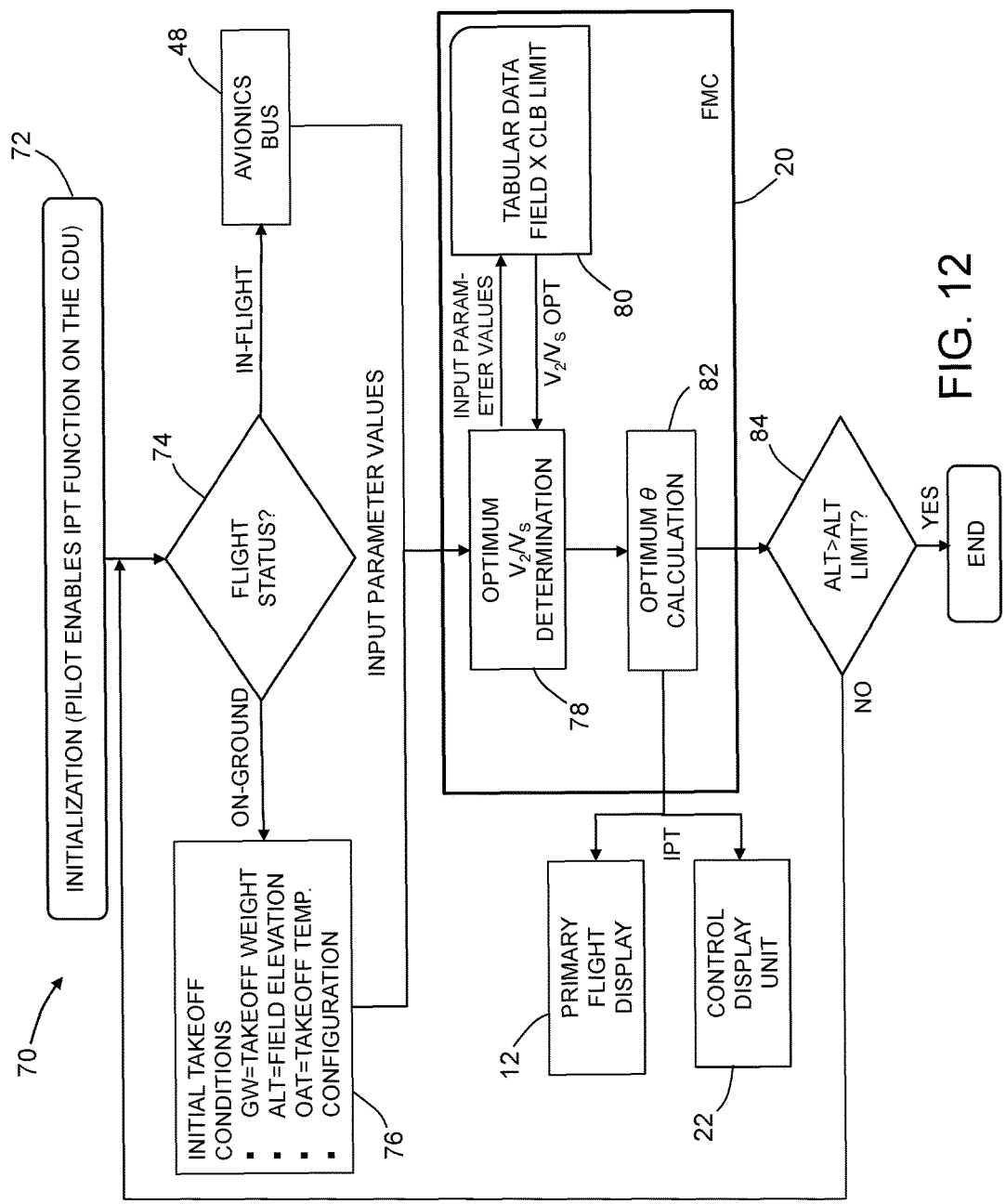
FIG. 12 is a flowchart identifying some steps of a method for displaying a variable initial pitch target to a pilot during takeoff of an airplane based on current takeoff conditions.

FIG. 12 is a flowchart identifying some steps of a method 70 for displaying symbology representing a variable initial pitch target to a pilot during takeoff of an airplane based on current takeoff conditions. During initialization (step 72), the pilot enables the IPT function by manipulating input elements on the CDU 22. The CDU 22 then determines the flight status (step 74). If the airplane is on the ground, the initial takeoff conditions are retrieved from an internal memory 76 in the flight management computer 20 or in an electronic flight bag. If the airplane is in flight, then the initial takeoff conditions are sent from an avionics bus 48 to the flight management computer 20. The initial take off conditions include takeoff weight of the airplane 28, field elevation of the runway 26, outside air temperature at takeoff and airplane configuration, i.e., flap setting and bleed and anti-ice status (hereinafter "input parameter values"). These input parameter values are sent to the flight management computer 20. The flight management computer 20 is configured (i.e., programmed) to execute an IPT calculation algorithm comprising the following steps: determining the optimum ratio of takeoff safety speed to stall speed (step 78); calculating the optimum initial pitch angle $\theta$ (step 82) based in part on the optimum ratio of takeoff safety speed to stall speed (e.g., using the equation for $\theta$ set forth above); and sending commands to the primary flight display 12 and to the CDU 22 instructing both to display symbology representing an initial pitch target equal to optimum initial pitch angle $\theta$. Step 78 comprises retrieving the optimum ratio of takeoff safety speed to stall speed from a lookup table stored in internal memory 80 of the flight management computer 20 using interpolation. More specifically, the lookup table contains a multiplicity of IPT values organized according to pre-set values of the input parameters. To the extent that the input parameter values do not match the pre-set parameter values, the flight management computer is configured to find an intermediate IPT value by interpolation.

The above-described process is repeated until the altitude of the airplane reaches a preset altitude limit. More specifically, after each calculation of the optimum initial pitch angle $\theta$ (step 82), a determination is made whether the altitude of the airplane is greater than the altitude limit (step 84). If the altitude of the airplane is not greater than the altitude limit, then the above-described process is repeated and the optimum initial pitch angle $\theta$ is recalculated. If the altitude of the airplane is greater than the altitude limit, then the IPT function is turned off.

Figure 13:
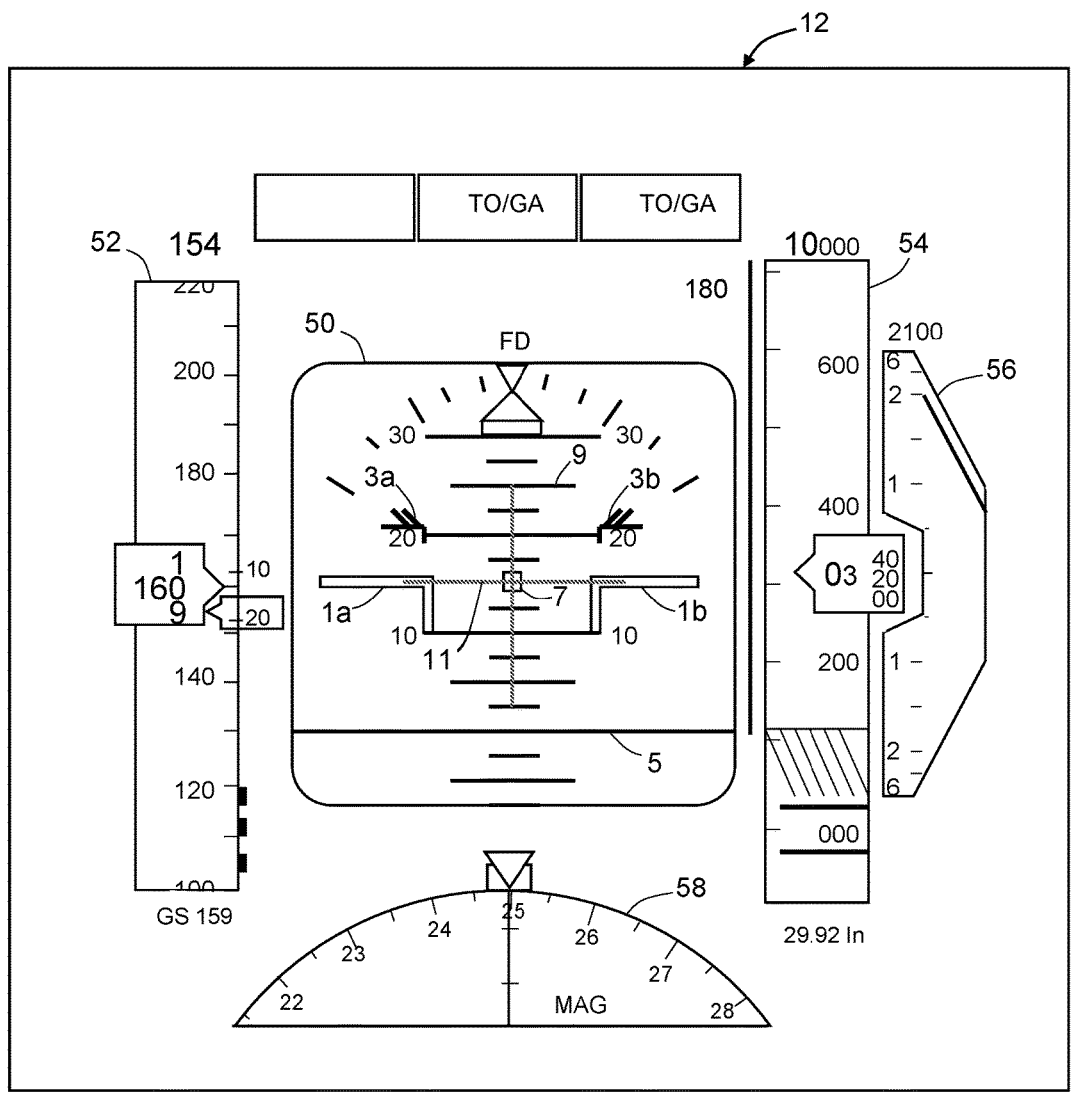
FIG. 13 is a diagram representing a front view of a primary flight display incorporated in a system of the type partly depicted in FIG. 1, which system may be configured to display symbology representing an initial pitch target on the primary flight display.

As previously mentioned, symbology indicating the initial pitch target can be displayed on the primary flight display 12. FIG. 13 is a diagram representing an exemplary screenshot from the primary flight display 12. The center of the primary flight display 12 includes an attitude indicator 50, which gives the pilot information about the airplane's pitch and roll characteristics, and the orientation of the airplane with respect to the horizon. To the left and right of the attitude indicator 50 are the airspeed indicator 52 and the altitude indicator 54, respectively. The airspeed indicator 52 displays the speed of the airplane in knots, while the altitude indicator 54 displays the airplane's altitude above mean sea level. Both of these indicators are presented as vertical "tapes", which scroll up and down as altitude and airspeed change. Both indicators have "bugs", that is, indicators that show various important speeds and altitudes, such as V speeds calculated by the flight management computer 20, do-not-exceed speeds for the current configuration, stall speeds, selected altitudes and airspeeds for the autopilot 6, and so forth. The vertical speed indicator 56, next to the altitude indicator 54, indicates to the pilot how fast the airplane is ascending or descending, or the rate at which the altitude changes. At the bottom of the primary flight display 12 is the heading display 58, which shows the pilot the magnetic heading of the airplane. This functions much like a standard magnetic heading indicator, turning as required.

In accordance with one embodiment of the system disclosed herein, the display computer 10 controls the primary flight display 12 to display an IPT indicator 11 which indicates the IPT value calculated by the flight management computer 20. More specifically, the primary flight display 12 displays the IPT indicator 11 indicating an initial pitch target relative to a horizon indicator 5. The IPT indicator 11 is designed to be unambiguous and easily discernible by the pilot during takeoff. In this example, the IPT indicator 11 is a horizontal line. The pilot is informed that the airplane is at the initial pitch target when the IPT indicator 11 is aligned with the wing symbols 1a and 1b. The symbols 3a and 3b indicate pitch limit. If the airplane targets a pitch above this limit, the airplane will go into stall.

Referring still to FIG. 13, the pitch angle scale lines 9 (i.e., the short horizontal lines of different length which appear in the central portion of the attitude indicator 50 at equal-spaced vertical intervals) form a scale showing a respective set of pitch angles. The nose symbol 7 (in this example, a small square) at the center of the attitude indicator 50 represents the nose 30 of the airplane 28 (see FIG. 3), while the wing symbols 1a and 1b (in this example, a pair of mirror-image rectilinear lines) on opposite sides of the nose symbol 7 represent the wings of the airplane 28. The nose symbol 7 and wing symbols 1a and 1b are always displayed and are fixed, i.e., do not move on the attitude indicator 50, whereas the horizon indicator 5, pitch angle scale lines 9 and IPT indicator 11 move in unison as the pitch angle of the airplane 28 changes.

In the example depicted in FIG. 13, the initial pitch target, as indicated by the vertical position of the IPT indicator 11, is 15 degrees. The fact that the wing symbols 1a and 1b are aligned with the IPT indicator 11 in FIG. 13 indicates to the pilot that the initial pitch target has been achieved. If the current pitch angle were less than the initial pitch target, the IPT indicator 11 would be above the wing symbols 1a and 1b.

The pilots would be oriented to follow the initial pitch target indicated by the IPT indicator 11 during takeoff. No significant workload increase is expected. However, the initial pitch target would not be fixed as in the current conventional V-speeds philosophy (between 12 and 15 degrees depending on the airplane model). In the case wherein the primary flight display 12 is off (or inoperative), the optimum pitch target function should be disabled.

Figure 14:
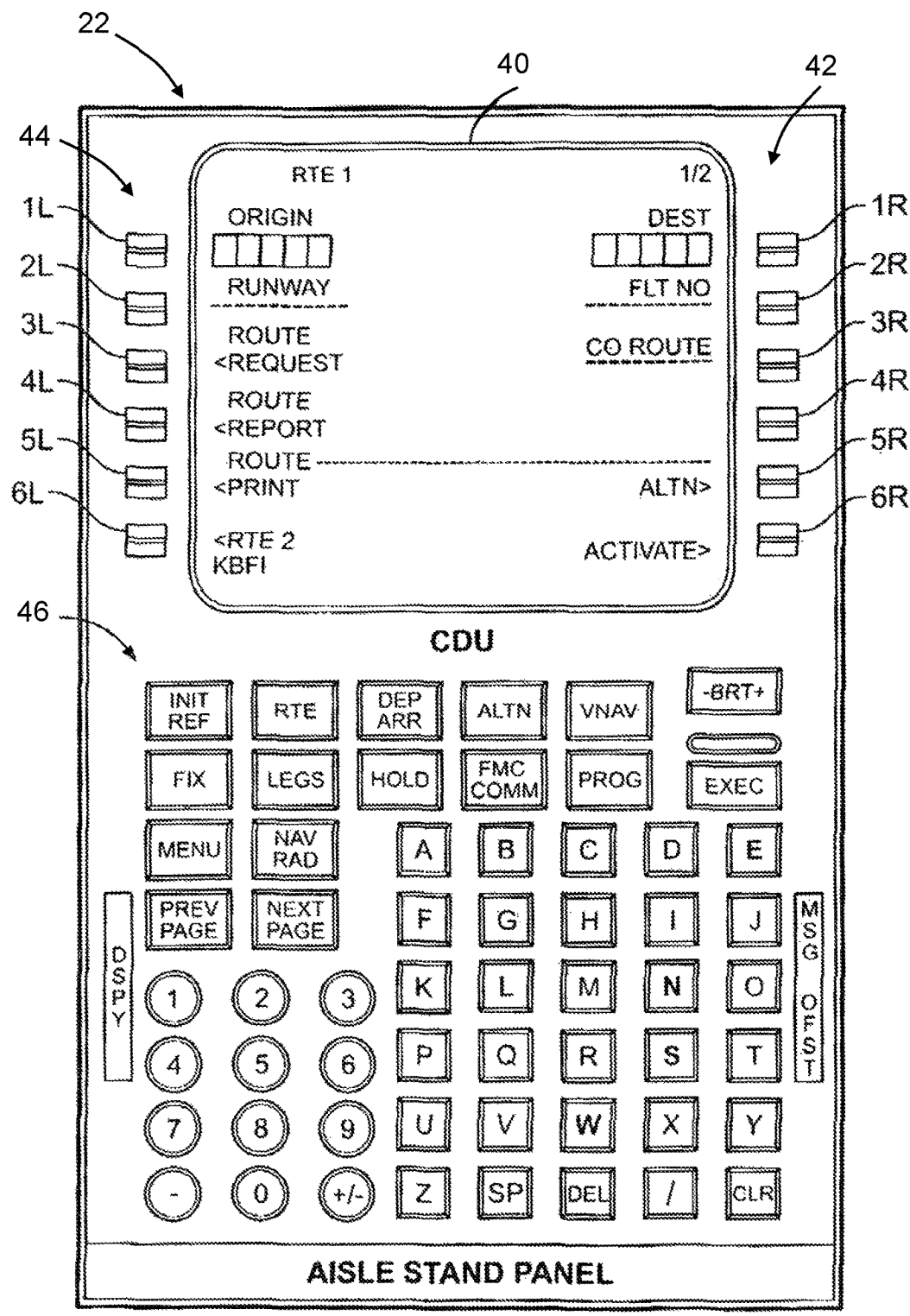
FIG. 14 is a diagram representing a front view of a control display unit incorporated in the flight management system of a commercial airplane, which flight management system may be configured to display symbology (in this example, a graphic symbol) representing an initial pitch target on the control display unit.

In accordance with an alternative embodiment, symbology representing the initial pitch target may also be displayed on the CDU 22. FIG. 14 is a diagram representing a front view of a CDU 22 for a commercial airplane. The CDU 14 has a liquid crystal display (LCD) screen 40 and a keypad 46. Keypad 46 includes CDU page keys, alphanumeric entry keys, and various CDU display function keys. The LCD screen 40 can have at least one entry field, a plurality of display lines, and a plurality of line select keys corresponding to display lines. A typical CDU 14 includes twelve display lines and twelve line select keys, including six on the right that form a right line select key set 42 (respectively identified by the designations 1R through 6R) and six on the left that form a left line select key set 44 (respectively identified by the designations 1L through 6L). The entry field for the depicted CDU 14 is below the twelfth display line and is commonly referred to as the "scratchpad". The scratchpad is a buffer to hold all data for review prior to executing the input. As data is keyed into the CDU 14 with the keypad 46, the entered values are displayed within the scratchpad field at the bottom of the LCD screen 40. The conventional method of entering and displaying information on the CDU requires multiple inputs by the pilot. The pilot first enters the information into the scratchpad entry field using the keypad 46 and then presses one of the line select keys associated with the display line where the entered information is to be displayed.

The labeled function keys of keypad 46 are used to call up specific top-level pages of the CDU 14 and to simultaneously dedicate the line select keys to the functions indicated on that page. Some functions, which are less frequently used in flight, are accessed through the index and flight plan edit function keys and then via line select keys 1L-6L and 1R-6R on the respective menu page. The line select keys 1L-6L and 1R-6R can be used to access lower level pages, toggle modes of the function, enter data in the associated field, or copy data in the scratchpad. When undefined line select keys are pressed, no operation is performed and no annunciation is displayed.

Figure 15:
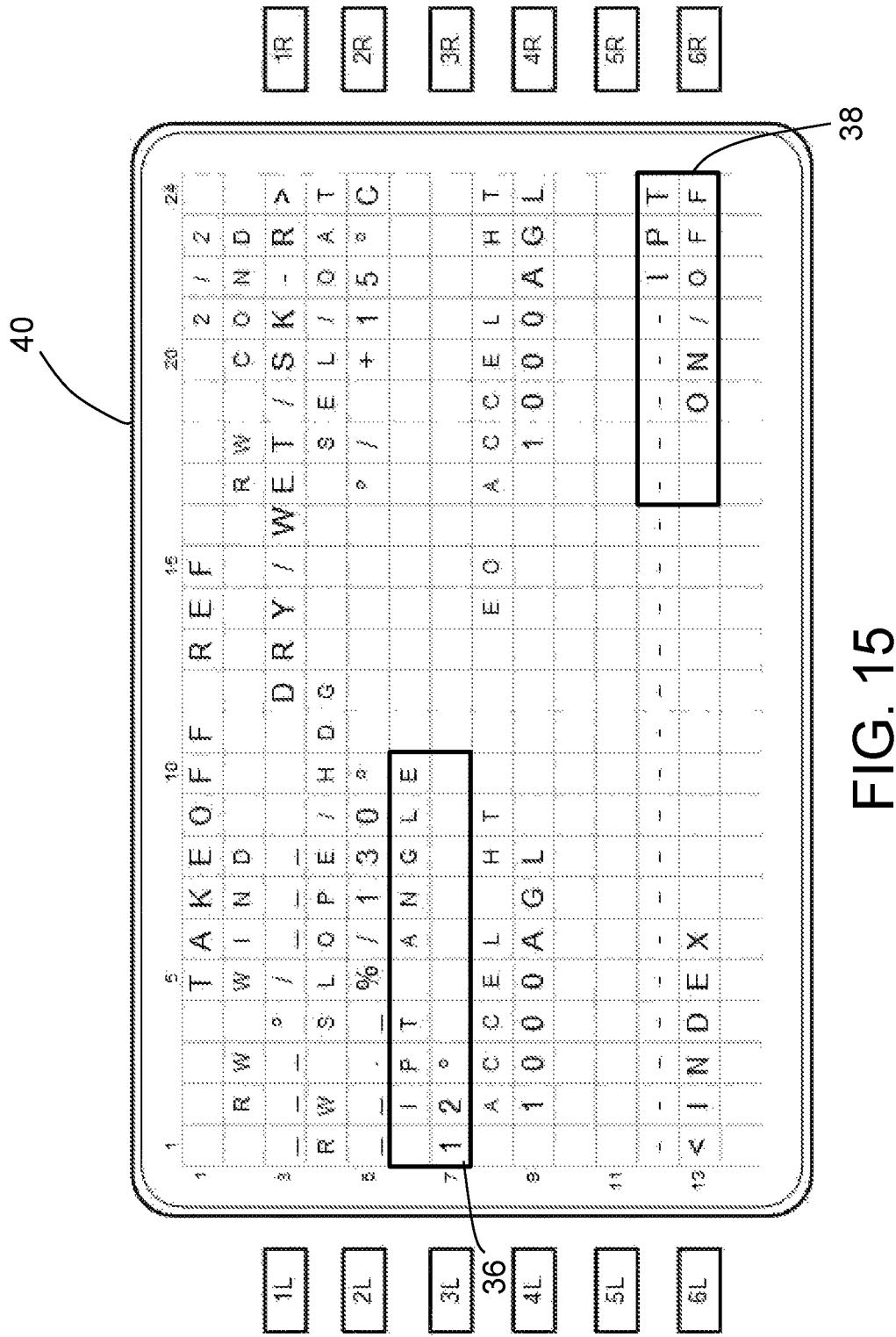
FIG. 15 is a diagram representing a front view of a CDU page that is displaying first symbology (in this example, alphanumeric symbols) representing an initial pitch target and second symbology (in this example, alphanumeric symbols) indicating whether the initial pitch target is turned on or off.

FIG. 15 is a diagram representing a front view of a CDU page named "TAKEOFF REF" that is displaying first symbology 36 (in this example, alphanumeric symbols) representing an initial pitch target value and second symbology 38 (in this example, alphanumeric symbols) indicating whether the initial pitch target function is turned ON or OFF. The IPT value calculated by the flight management computer 20 is displayed as shown on the TAKEOFF REF page. This feature may be switched off (i.e., toggled OFF and ON) at the pilot's discretion by pressing line select key 6R. In the case wherein this display function is disabled by the pilot, the pitch target logic will revert to the fixed initial pitch target.

The IPT concept disclosed herein may also be implemented in takeoff performance software tools in order to optimize payload calculations. FIG. 16 is a diagram representing a front view of a display screen 60 incorporated in an electronic flight bag configured with takeoff performance software. In this example, alphanumeric symbols 62 are displayed which indicate the value of the initial pitch target.

An electronic flight bag is an electronic information management device that helps flight crews perform flight management tasks more easily and efficiently with less paper. It is a general-purpose computing platform intended to reduce, or replace, paper-based reference material often found in the pilot's carry-on flight bag, including the airplane operating manual, flight-crew operating manual, and navigational charts (including moving map for air and ground operations). In addition, the electronic flight bag can host purpose-built software applications to automate other functions normally conducted by hand, such as performance take-off calculations.

The use of the variable pitch target technique disclosed herein would be recommended where operations are to be limited by climb and obstacle performance on conventional takeoff performance computations (same requirements as improved climb).

In accordance with the embodiment disclosed herein, the flight management computer 20 calculates the initial pitch target based on the information available. The method may include receiving airplane data at the flight management computer 20. The airplane data may be preloaded into the flight management computer 20 and/or manually entered into the flight management computer 20. For example, static information such as airport parameters including airport elevation, runway length, runway gradient, and obstacle location and obstacle height may be preloaded into the flight management computer 20. Variable or changing airport parameters such as outside air temperature, barometric pressure, wind direction and speed, and/or runway conditions (e.g., wet, snow, slush, ice) may manually or automatically entered into the flight management computer 20 in real-time. Likewise, airplane data such as airplane takeoff weight, airplane center of gravity, and/or other airplane data that may affect takeoff performance may be entered into the flight management computer 20 after the airplane has been fueled and loaded with passengers, cargo, and other payload prior to takeoff.

While systems and methods for enhancing the performance of an airplane during takeoff by increasing the amount of payload an airplane can carry have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. For example, the display computer 10 and flight management computer 20 identified in FIG. 1, in conjunction and in communication, may be classified as a "computer system". As used in the preceding sentence, the terms "computer" and "processor" both refer to devices comprising at least a processing unit (e.g., a central processing unit, an integrated circuit or an arithmetic logic unit).

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for controlling an airplane during takeoff using information displayed to a pilot in a cockpit or on a flight deck, comprising:
    retrieving an optimum ratio of takeoff safety speed to stall speed from a non-transitory tangible computer-readable storage medium;
    calculating an optimum initial pitch angle of an airplane on a runway, wherein the optimum initial pitch angle is calculated based in part on the optimum ratio of takeoff safety speed to stall speed;
    displaying symbology representing an initial pitch target corresponding to the optimum initial pitch angle on a display screen during takeoff; and
    inputting a command to a flight control computer that sets flaps of the airplane at a flap angle that will cause the airplane to achieve the initial pitch target during takeoff rotation.

2. The method as recited in claim 1, wherein the display screen is a primary flight display.

3. The method as recited in claim 1, wherein the display screen is incorporated in a control display unit.

4. The method as recited in claim 1, wherein the display screen is incorporated in an electronic flight bag.

5. The method as recited in claim 1, wherein retrieving an optimum ratio of takeoff safety speed to stall speed from a non-transitory tangible computer-readable storage medium comprises inputting a plurality of input parameter values to a lookup table.

6. The method as recited in claim 1, wherein the plurality of input parameter values comprise a takeoff weight of the airplane, a field elevation of the runway and an outside air temperature.

7. The method as recited in claim 6, wherein the plurality of input parameter values further comprise a flap setting and a bleed and engine anti-ice status.

8. An avionics system comprising an electronic flight bag having a display, a computer system configured to calculate an optimum initial pitch angle of an airplane on a runway, and a non-transitory tangible computer-readable storage medium communicatively coupled to the computer system, wherein the computer system is further configured to retrieve an optimum ratio of takeoff safety speed to stall speed from the non-transitory tangible computer-readable storage medium, calculate the optimum initial pitch angle based in part on the optimum ratio of takeoff safety speed to stall speed, and then send commands to the display of the electronic flight bag to display symbology representing an initial pitch target indication corresponding to the optimum pitch angle, to thereby provide takeoff guidance to a pilot by display of the initial pitch angle symbology during the takeoff procedure such that the pilot may set the flaps of the airplane to achieve the initial pitch target during takeoff.

9. The avionics system as recited in claim 8, wherein retrieving an optimum ratio of takeoff safety speed to stall speed from a non-transitory tangible computer-readable storage medium comprises inputting a plurality of input parameter values to a lookup table.

10. The avionics system as recited in claim 9, wherein the plurality of input parameter values comprise a takeoff weight of the airplane, a field elevation of the runway and an outside air temperature.

11. The avionics system as recited in claim 10, wherein the plurality of input parameter values further comprise a flap setting and a bleed and engine anti-ice status.

12. An airplane comprising:
- a plurality of flaps;
- a plurality of actuators for moving the plurality of flaps to have a flap angle;
- a flight control computer configured to set the flaps at a flap angle that will cause the airplane to achieve an initial pitch target corresponding to an optimum initial pitch angle during takeoff rotation; and
- a flight management system comprising a flight management computer and a control display unit communicatively coupled to the flight management computer, wherein the control display unit comprises a display screen, and the flight management computer is configured to execute an initial pitch target function in which the optimum initial pitch angle is calculated and then a command is sent to the control display unit instructing the control display unit to display symbology representing an initial pitch target corresponding to the optimum initial pitch angle on the display screen, and wherein the flight management computer is further configured to retrieve an optimum ratio of takeoff safety speed to stall speed from a lookup table and calculate the optimum initial pitch angle based in part on the optimum ratio of takeoff safety speed to stall speed.

13. The airplane as recited in claim 12, wherein the control display unit is configured to receive an input from a pilot that enables the initial pitch target function and then control the display screen to display symbology representing whether the initial pitch target function has been enabled or not.

* * * * *